3,218,279
HIGH TEMPERATURE RESISTANT BORATED ALKYD RESINS AND THEIR PREPARATION
Joseph P. Stalego, Newark, Ohio, assignor to Owens-Corning Fiberglas Corporation, a corporation of Delaware
No Drawing. Filed Jan. 23, 1956, Ser. No. 560,852
4 Claims. (Cl. 260—29.3)

This invention relates to water-soluble polyester resins and particularly to modified alkyd resins which exhibit improved physical properties including resistance to high temperature. The invention also relates to modified reaction products of a polyhydric alcohol and an unsaturated dicarboxylic acid.

This application is a continuation-in-part of my copending application, Serial Number 531,818, filed August 31, 1955, and entitled "High Temperature Glass Fiber Insulation Product and Method for Manufacturing Same," now U.S. Patent 2,941,904.

The copending application contains a disclosure of binders for fibrous glass products comprising alkyd resin, urea borate, phenolic resin, and a tempering oil. Reference is also made to an improved alkyd resin wherein 3 percent by weight of boric acid is substituted for an equivalent amount of maleic acid when preparing an alkyd resin of a polyhydric alcohol such as pentaerythritol with an unsaturated dicarboxylic acid such as maleic acid. Modified alkyd resins and their preparation is the subject of the present application.

In the past wide use of phenolic resins as binders has been made in the fibrous glass industry. The phenol formaldehyde resins and some of the other lesser used resins such as urea formaldehyde and the like are quite satisfactory for most uses; however, for certain high temperature installations it is desirable to use binders having less susceptibility to punking and better resistance to thermal breakdown. Punking as used herein is the oxidation without a flame or thermal decomposition of the resinous binder upon fibrous glass products.

It is an object of this invention to provide a polyester resin having increased resistance to breakdown at high temperature.

It is a further object to provide such a resin that has a fast rate of cure and one that forms a hard solid resinous mass regardless of whether or not it is spread into thin films.

It is also an object to provide an alkyd resin which can be applied to fibrous materials as a binder with great efficiency.

Reaction products of the type described in the Kneisley Patent 2,646,410 are those obtained by reacting a polyhydric alcohol such as pentaerythritol with an unsaturated dicarboxylic acid such as maleic anhydride or maleic or fumaric acid and a glycol such as ethylene glycol. A modified alkyd resin is provided either by replacing part of the maleic acid, one of the reactants in the preparation of the polyester with boric acid and carrying out the reaction to form a borated alkyd resin or the alkyd resin formed by the reaction of a polyhydric alcohol with an unsaturated dicarboxylic acid is reacted with boric acid to provide a borated alkyd resin.

A water soluble alkyd resin such as one formed by the condensation of pentaerythritol and maleic acid with 10 to 15 percent ethylene glycol may be made more punk resistant by adding (1) boric acid, or (2) boric acid and a condensation product of urea, boric acid, formaldehyde and ethylene glycol, known as "urea borate," to the alkyd resin.

Punk-resistant modified alkyd resins are also prepared by heating in a reaction kettle boric acid, a polyhydric alcohol and a dicarboxylic acid. All three reactants can be charged and reacted in a single step or, if desirable, the boric acid and polyhydric alcohol are introduced into the reaction kettle and completely reacted, and then the dicarboxylic acid is added and the reaction carried further. The boron is located at the center of the molecule when the latter technique is used and it is believed that the improved punk resistance results from such a molecular structure. It is believed the molecular structure appears as follows:

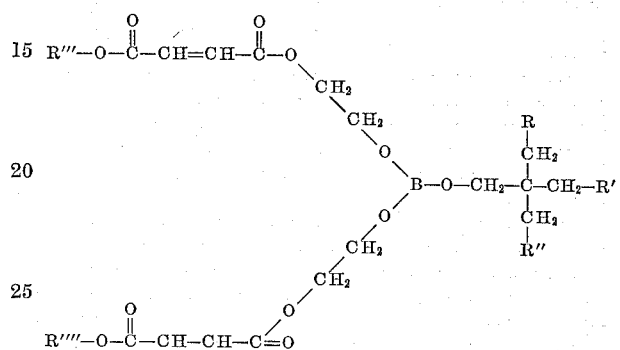

R, R', R'', R''', and R'''' may be glycol, pentaerythritol, hydrogen, or any hydroxy or amino containing group.

The polyhydric alcohols which may be used include ethylene glycol, propylene glycol, glycerol, pentaerythritol, mannitol, sorbitol, or mixtures of these. Maleic acid or maleic anhydride can be used as the acid. Unsaturated alcohols may be used also.

The reactants may be added in various proportions to provide a heat-convertible reaction product that is suitable as a binder after curing. In general the OH/COOH ratio of suitable reactants varies from about 2.5 with a minimum acid value of about 40 to 2.0 with a minimum acid value of about 85 and further to about 1.0 with a minimum acid value of 240. As indicated, the OH/COOH ratio of the reactants used in preparing heat-convertible resins varies with the acid value. Any resins resulting from esterification of reactants wherein the OH/COOH ratios are in the operable area as disclosed in Patent 2,646,410 may be borated by substituting an equivalent of boric acid for an equivalent of the dicarboxylic acid.

When these borated resins are to be used in binder compositions such as those used with fibrous glass products, it has been found that the binder compositions should contain not more than 15 percent boric acid in the borated resin. A range of from 2 to 5 percent boric acid in the reacted resin is preferred. In the following example 2.48% by weight of boric acid is added as a reactant to the reaction mixture.

*Example 1*

A borated resin is prepared as follows: 20.8 parts by weight of maleic acid, 4.7 parts of ethylene glycol and 24 parts of pentaerythritol and 1.26 parts of boric acid are mixed in a glass reaction vessel and water is added until a slurry is obtained. Air is flushed from the reaction vessel and the mixture heated to 150° C. The reaction is carried out until the acid value of the product is about 40. Water is poured into the reaction vessel to provide a 15 percent solids product.

The borated alkyd resin produced as in Example 1 is mixed with urea borate, phenol formaldehyde resin and an oil to provide a binder suitable for application to fibrous glass products. These ingredients are mixed in the following proportions:

| | Parts by weight |
|---|---|
| Borated alkyd resin | 431.0 |
| Urea borate | 249.0 |
| Phenol formaldehyde resin | 54.0 |
| Petroleum tempering oil | 16.5 |
| Ammonia _____of 28° Baumé | 60.0 |
| Water | 7690.0 |

The urea borate is prepared by condensation reaction of 5 parts by weight of formaldehyde, 4 parts by weight of urea, 2.5% by weight of boric acid based on the total weight of the urea and formaldehyde and 10% by weight of ethylene glycol based on the total weight of the urea and formaldehyde. These proportions are identical with those set forth in the method of preparing urea borate disclosed in a copending Stalego application Ser. No. 531,818 of which the present application is a continuation-in-part.

The above binder was applied to a fibrous glass product formed of fibers produced by introducing small diameter primary fibers into a blast from a burner. The binder as applied to the burner blown fibers is about 8.5 percent solids, the resin solids comprising about 57.5 percent alkyd resin, 35 percent urea borate and 7.5 percent phenol formaldehyde resin. These resin solids are in a mixture which includes water and about 4 percent by weight of petroleum tempering oil. The fibrous glass product, which had a density of about 0.75 pound per cubic foot, is capable of withstanding temperatures of up to 1650° F. or even higher without punking or burning. To provide a product suitable for railroad insulation, sufficient binder is applied to provide a final product comprising from 10 to 22 percent binder.

The borated alkyd resin of Example 1 is formulated as follows to provide a binder suitable for making a high density board and molded pipe insulation.

| | Parts by weight |
|---|---|
| Alkyd resin | 517.5 |
| Urea borate | 270.0 |
| Phenol formaldehyde resin | 68.0 |
| Tempering oil | 48.0 |
| Ammonia | 67.5 |
| Dye (Crosein Scarlet) | .3 |
| Water | 3279.0 |

Molded high density products including 7 pound per cubic foot molded pipe insulation and 10.5 pound per cubic foot board withstood the Coast Guard Hot Rivet Test with no punking or failure.

Enough 28° Baumé ammonia is added to the binder to adjust the pH of the mix to about 8. The pH may be adjusted to from about 7 to 10 with the pH of 8 being preferred.

The tempering agent may comprise 90 percent by weight petroleum oil and 10 percent by weight of an emulsifying agent consisting of 1 part of petroleum sulfonate (Morpel X-914) and 2 parts of iso-octyl phenyl ether of polyethylene glycol, the latter being known as Triton X-114.

The solubility of the alkyd resin varies depending upon the hydroxyl/carboxyl ratio and the acid number of the resinous product. The ratio of the hydroxyls to the carboxyls should vary from about 0.6 to 3.5 and preferably from about 0.7 to 2.0. It has been discovered that when the alkyd resin is borated, the solubility of the product is improved over the unmodified alkyd resin formed from the same reactants without the substitution of boric acid for an equivalent amount of the maleic acid.

The ammonia is added to the binder recipes in order to adjust the pH to prevent the binder mix from etching the steel tanks, and also to increase the pot life of the binder. Although ammonia is not necessary to provide solubility of the borated alkyd resin itself, it has been found desirable to add ammonia to improve solubility of a binder formulation which includes some phenolic resin. The binders as disclosed are cured by heating to a temperature of from about 400° F. to about 750° F. After cure the binder becomes an insoluble, infusible product which holds the fibers within the product in position with relation to one another.

The borated alkyd resin provides improved heat resistance and non-punking characteristics to binder formulations which may be applied to fibrous glass products. In addition, the borated alkyd resin has improved properties in and of itself over unmodified alkyd resins of a similar type. The borated alkyd has improved solubility in water, greater resistance to punking, greater resistance to burning, a faster curing rate, and in addition, the resin provides greater application efficiency to any binder within which it is included as an ingredient.

Although specific examples have been given, the invention is not limited thereto but instead includes all obvious modifications and variations within the spirit and scope of the appended claims.

I claim:

1. A binder for glass fibers comprising 431 parts by weight of a water-soluble reaction product of a polyhydric alcohol, an unsaturated dicarboxylic acid and boric acid, said polyhydric alcohol being selected from the group consisting of ethylene glycol, propylene glycol, glycerol, pentaerythritol, mannitol, sorbitol and mixtures of these, said unsaturated dicarboxylic acid being selected from the group consisting of maleic acid and maleic anhydride, said boric acid being present in said binder composition in amounts such that 2 to 5% boric acid added as a reactant is included in the reaction product, said reactants being present in proportions so that the OH/COOH ratio is from 0.6 to 3.5, said reaction product being prepared at a temperature of about 150° C., which product can be diluted with water to a concentration of at least 15% of prdouct solids in water; 249 parts by weight of urea borate prepared by condensation reaction of 5 parts by weight of formaldehyde, 4 parts by weight of urea, 2.5% by weight of boric acid based on total weight of the urea and formaldehyde and 10% by weight of ethylene glycol based on the total weight of urea and formaldehyde; 54 parts by weight of phenol formaldehyde resin; 16.5 parts of petroleum tempering oil comprising petroleum oil with 10% by weight of an emulsifying agent comprising petroleum sulfonate and iso-octyl-phenyl ether of polyethylene glycol; 60 parts of ammonia; and 7690 parts of water.

2. A fibrous glass product comprising fibers bonded with the said binder of claim 1.

3. A binder for glass fibers comprising 517.5 parts by weight of a water-soluble reaction product of a polyhydric alcohol, an unsaturated dicarboxylic acid and boric acid, said polyhydric alcohol being selected from the group consisting of ethylene glycol, propylene glycol, glycerol, pentaerythritol, mannitol, sorbitol, and mixtures of these, said unsaturated dicarboxylic acid being selected from the group consisting of maleic acid and maleic anhydride, said boric acid being present in said binder composition in amounts such that 2 to 5% boric acid added as a reactant is included in the reaction product, said reactants being present in proportions so that the OH/COOH ratio is from 0.6 to 3.5, said reaction product being prepared at a temperature of about 150° C., which product can be diluted with water to a concentration of at least 15% of product solids in water; 270 parts by weight of urea borate prepared by condensation reaction of 5 parts by weight of formaldehyde, 4 parts by weight of urea, 2.5% by weight of boric acid based on the total weight of urea and formaldehyde and 10% by weight of ethylene glycol based on the total weight of urea and formaldehyde; 68 parts by weight of phenol formaldehyde resins; 48 parts by weight of petroleum tempering oil; 67.5 parts by weight of ammonia; and 3279 parts by weight of water.

4. A fibrous glass product bonded with the heat set binder of claim 3.

References Cited by the Examiner

UNITED STATES PATENTS

| 1,969,761 | 8/1934 | Rosenblum | 260—25 |
| 2,197,855 | 4/1940 | Ellis | 260—75 XR |
| 2,646,410 | 7/1953 | Kneisley | 260—75 XR |

FOREIGN PATENTS 358,491  10/1931  Great Britain.

WILLIAM H. SHORT, *Primary Examiner.*

PHILIP E. MANGAN, MILTON STERMAN, HAROLD N. BURNSTEIN, LOUISE P. QUAST, *Examiners.*